G. A. CAMPBELL, O. B. BLACKWELL & E. H. COLPITTS.
SYSTEM FOR MEASURING CAPACITIES.
APPLICATION FILED APR. 11, 1912.

1,167,677.

Patented Jan. 11, 1916.
2 SHEETS—SHEET 1.

Inventors
George A. Campbell.
Otto B. Blackwell.
Edwin H. Colpitts.
By Geo. Willis Pierce
Attorney.

Attest
Frank O. Lockwood
Joseph A. Gately

G. A. CAMPBELL, O. B. BLACKWELL & E. H. COLPITTS.
SYSTEM FOR MEASURING CAPACITIES.
APPLICATION FILED APR. 11, 1912.

1,167,677.

Patented Jan. 11, 1916.

2 SHEETS—SHEET 2.

Inventors
George A. Campbell
Otto B. Blackwell
Edwin H. Colpitts
By Geo. Willis Pierce
Attorney.

Attest,
Frank O. Lockwood
Joseph A. Gately

UNITED STATES PATENT OFFICE.

GEORGE A. CAMPBELL, OF BROOKLYN, NEW YORK, AND OTTO B. BLACKWELL, OF MAPLEWOOD, AND EDWIN H. COLPITTS, OF EAST ORANGE, NEW JERSEY, ASSIGNORS TO AMERICAN TELEPHONE AND TELEGRAPH COMPANY, A CORPORATION OF NEW YORK.

SYSTEM FOR MEASURING CAPACITIES.

1,167,677.  Specification of Letters Patent.  Patented Jan. 11, 1916.

Application filed April 11, 1912. Serial No. 690,060.

*To all whom it may concern:*

Be it known that we, GEORGE A. CAMPBELL, residing at Brooklyn, in the county of Kings and State of New York, OTTO B. BLACKWELL, residing at Maplewood, in the county of Essex and State of New Jersey, and EDWIN H. COLPITTS, residing at East Orange, in the county of Essex and State of New Jersey, have invented certain Improvements in Systems for Measuring Capacities, of which the following is a specification.

This invention relates to a system for measuring capacities, and one which is especially adapted for determining capacity unbalances in a telephonic phantom circuit.

The principal objects of the invention are to provide a ready and accurate means for testing capacity relations between all the elements of a circuit of this character.

Figures 1, 2:
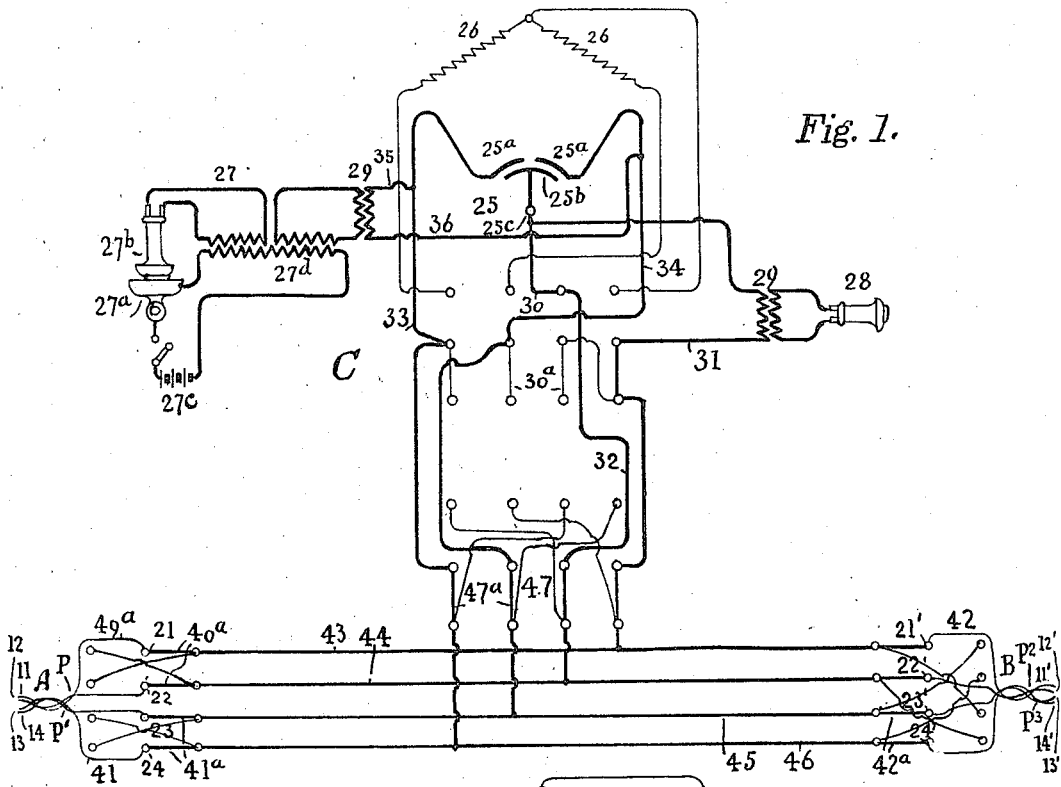
Figure 3:
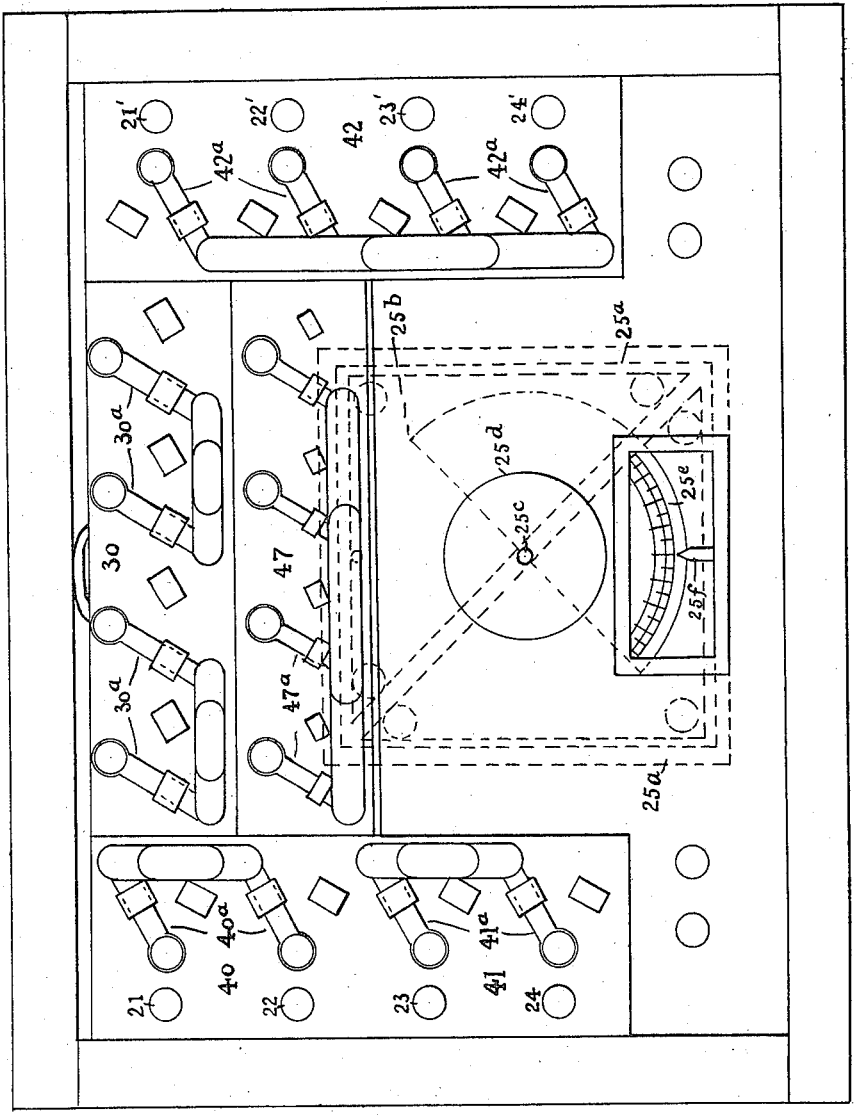
Figure 4:
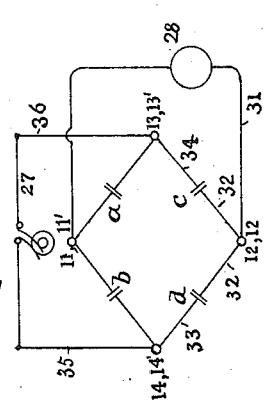
Figure 5:
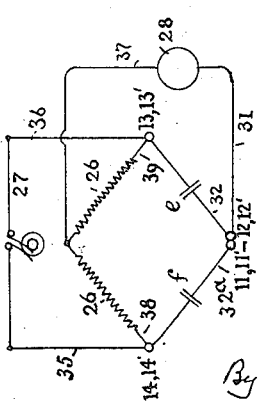

In the annexed drawings, Figure 1 shows diagrammatically an embodiment of our invention applied to the testing of the side to side capacity unbalance of a phantom circuit; Fig. 2 is a similar view illustrating the arrangement for testing phantom to side unbalances; Fig. 3 is a top plan view of a testing apparatus showing the terminals, switches and capacity registering device; and Figs. 4 and 5 represent schematically the theories of the arrangements of Figs. 1 and 2, respectively.

The same characters of reference designate like parts in all figures of the drawings.

Our invention will be explained in its application to a "quad" or portion of a cable adapted for use in forming a phantom circuit, the four conductors of which are twisted in pairs and these pairs being twisted together, each two-conductor pair furnishing a physical circuit, while these circuits taken with the conductors of each in parallel give a third pair of conductive elements constituting the phantom circuit.

In Figs. 1 and 2 of the drawings are illustrated two successive sections A and B of the quad as they might terminate at a cable manhole, section A containing the physical pair P comprising the conductors 11 and 12, and the physical pair P' having conductors 13 and 14, these together forming the phantom pair 11—12, 13—14: the section B has corresponding pairs P² with the conductors 11', 12' and P³, with the conductors 13', 14', together with the phantom pair 11'—12', 13'—14'.

The adjacent ends of the conductors of the sections appear in Figs. 1 and 2 connected to the external terminals of the testing apparatus C, conductor 11 being attached to terminal 21, and conductors 12, 13, 14, 11', 12', 13' and 14' to terminals 22, 23, 24, 21', 22', 23' and 24', respectively. Joined to these terminals through switches and conductors to be later described is an adjustable condenser 25; an impedance device 26, 26; a source of variable potential 27 and a potential detecting device 28, these together furnishing unbalance indicating means; and induction devices 29, 29, through which the source of potential and the detecting device are connected to the other elements of the apparatus.

The condenser 25 is preferably of the well known air dielectric type, having two fixed capacity members $25^a$, $25^a$ which may each consist of one or more plates, while between these fixed capacity members moves an adjustable capacity member $25^b$ carried by a spindle $25^c$. A handle $25^d$ at the upper extremity of the spindle permits the adjustment of the member $25^b$, and a suitably graduated plate $25^e$ mounted upon the spindle and movable beneath a stationary index point $25^f$ registers the capacities between the members for different positions.

In the unbalance indicating means the source of variable potential is conveniently supplied by a "howler" set, comprising a mutually reacting telephone transmitter $27^a$ and receiver $27^b$, supplied with current from a battery $27^c$ and acting through an induction coil $27^d$. The potential detecting device 28 may consist of an ordinary telephone receiver. As the telephone receiver in use by the observer will necessarily be at varying distances from the other elements of the apparatus, and since the howler is mounted in a separate case, the relative position of which may also vary, the induction devices 29, which may be repeating coils of the usual type but preferably so wound as not to disturb the capacity relation of the system, are interposed to break the metallic continuity between the indicating means and other devices. This avoids the indeterminate and unbalanced capacities and conductances between the terminals which would be introduced were the receiver and howler in direct conductive relation and which would impair the accuracy of the results. Moreover, the apparatus generally is so symmetrically constructed and with such small capacities to outside conductors as not to affect the unbalances of the circuits.

The impedance devices 26, 26, which may be furnished by equal resistances, are used only for phantom to side testing, and to adapt the apparatus to either this purpose or to side to side testing a switch 30 is provided. When the movable arms 30ª of this switch are in the position indicated in Fig. 1, the impedances 26 are cut out of the circuit, and, referring particularly to the heavy lines in this Fig. 1, one of each of the opposite sets of external terminals corresponding to the successive quad sections is joined, beyond the switch 30, by a conductor 31 through a winding of the receiver repeating coil to the movable member 25ᵇ of the condenser, another opposite pair of terminals connected to the movable condenser member by conductor 32, and the third and fourth pairs separately united to the fixed members of the condenser by conductors 33 and 34. The repeating coil of the potential source 27 is also connected to the fixed members by conductors 35 and 36. With the switch arms 30ª in their alternate position, as in Fig. 2, the connection of the opposite pairs of external terminals through conductors 33 and 34 remain as before; the companion pairs are connected in parallel to the movable member of the condenser through conductors 32, 32ª; while the juncture of the impedances is joined by conductor 37 through the receiver repeating coil to conductor 32 and the corresponding external terminals; and the opposite extremities of the impedances are united to conductors 33 and 34, and therefore to the fixed capacity members, by conductors 38 and 39.

Between the switch 30 and the external terminals the connection is preferably as follows: Associated with the respective pairs, 21, 22 and 23, 24 of one set of terminals are switches 40 and 41, while associated with the other set of terminals 21', 22', 23', and 24' is a switch 42. Pairs of conductors 43, 44 and 45, 46 join the switches 40 and 41, respectively, with the switch 42. These conductors are in turn connected to the other elements of the apparatus through a switch 47. The switches 40 and 41 in the alternate positions of their movable members 40ª and 41ª either join the pairs of terminals 21, 22 and 23, 24 directly to the conductors 43, 44 and 45, 46, respectively, (see Fig. 1), or transpose the connection of the conductors of the pairs to the respective terminals, (Fig. 2). The switch 42 by the movement of its member 42ª gives a direct or transposed connection (see Figs. 1 and 2, respectively) of the pairs of terminals 21', 22' and 23', 24' to the pairs of conductors 43, 44 and 45, 46. Switch 47 is of the same character as switch 42, but serves to control through its movable member 47ª the direct connection or transposition of the pairs of conductors 43, 44 and 45, 46 to the testing devices (as appears, respectively, in full and dotted lines in Fig. 2), this being employed to enable the capacity relation of one or the other of the sides to the phantom circuit to be determined. It will therefore be seen that the apparatus may not only be arranged so that its internal connections are adapted to test either side to side or phantom to side unbalances, but also that the conductors under test may be connected to one another and to the other elements of the apparatus in various combinations.

In considering the use of the apparatus, it may be assumed that it is desired to test the capacity unbalances between the elements of a phantom circuit, of which the conductors of the successive sections A and B are united in different ways for the purpose of the test, the values thus arrived at showing the manner in which the conductors should be finally joined to give the best results. The theory of the system as applied to the measuring of capacity unbalance between the connected sections of the sides of a phantom circuit will be clear upon reference to Fig. 4 of the drawings, in which the capacities of the conductors being tested are considered as forming the arms of a Wheatstone bridge. At the respective apices of the bridge are shown the united conductor sections 11, 11'; 12, 12'; 13, 13'; 14, 14'. Condensers $a$, $b$, $c$ and $d$ in the arms of the bridge represent all the capacities which tend to cause cross-talk between side circuits; $c$ and $d$ also include the variable capacities which may be introduced by means of the condenser 25. If a variable potential is impressed upon the pair 13 13'—14, 14' from the source 27, and the observer listens at the telephone receiver 28 connected across the pair 11, 11'—12, 12', there will be a condition of equi-potential at 11, 11'—12, 12', and silence in the receiver, when the capacity values satisfy the equation $$\frac{a}{b} = \frac{c}{d}.$$

For the relation existing between the conductors, the capacity, as shown by the registering means 25ᵉ, 25ᶠ, which the observer finds it necessary to add to or subtract from $c$ and $d$ by means of the condenser 25 to give this condition, will be a measure of the unbalance between the side circuits 11, 11'—12, 12' and 13, 13'—14, 14'. This value having been obtained for the specified connections between the sections, these may be transposed by means of the switches 40, 41 and 42 so that the sides will consist of the pairs 11, 12'—12, 11' and 13, 13'—14, 14'; or 11, 11'—12, 12' and 13, 14'—14, 13'; or 11, 13'—12, 14' and 13, 11'—14, 12', etc., and the unbalances of these combinations determined.

As to the theory of the system in testing unbalances between the phantom and either of its sides reference may be had to Fig. 5, the conditions there indicated being brought about by the reversal of switch 30. The source of variable potential is included in the circuit as before. The two upper arms of the bridge are now furnished by the equal impedances 26, 26, the telephone receiver 28 being connected from the phantom element 11, 11'—12, 12' to the other element 13, 13'—14, 14' through the juncture of these impedances to avoid short circuiting the source of potential. The condensers $e$ and $f$ represent the capacities causing cross-talk between the phantom and its side 13, 13'—14, 14', together with the variation produced in said capacities by the adjustment of the condenser 25. The determination of the unbalance for different combinations of the section conductors is made in the same general manner as before. Then the switch 47 is reversed, giving the proper connection between the conductors and the testing devices to allow the unbalance of the phantom to the other side 11, 11'—12, 12' to be measured. The final splicing of the cable may be performed in such a manner as to give the least unbalance, all the measurements being taken into account.

As an example of the practical use of the system, assume the switches 40, 41 and 42 to be in their normal positions, connecting the groups of conductors directly 11 to 11', 12 to 12', 13 to 13' and 14 to 14', and the switches 30 and 47 so placed as to enable the capacity relation between the phantom P, $P^2$ and P', $P^3$ to its side P, $P^2$ to be measured. The observer, listening at the receiver 28, sets the movable member of the condenser until the disturbance caused by the howler is no longer heard, and the index is found to register twenty micro-microfarads. By reversing the switch 40 the connection of the side circuit P, $P^2$ is then transposed, so that it is connected 11, 12'—12, 11', and by a setting of the condenser an unbalance of forty micro-microfarads obtained. The switch 47 is then reversed and the relation of the phantom to the other side P', $P^3$ is tested, the companion pair P, $P^2$ being restored to its original condition by the switch 40, since this gave the better balance, and the pair now under test directly connected by the switch 41 set at normal; an unbalance of three hundred and thirty micro-microfarads results. Upon transposing the side P', $P^3$ by means of the switch 41, so that it is connected 13, 14'—14, 13' there is an unbalance of thirty micro-microfarads. With the pairs thus joined—the first P, $P^2$ direct and the second P', $P^3$ transposed, the switch 30 is moved to the position shown in Fig. 1 of the drawings and the capacity relation between the side circuits tested, obtaining an unbalance of ninety micro-microfarads. By the switch 40 the pair P, $P^2$ is then transposed—11, 12' and 12, 11', giving an unbalance of ten micro-microfarads. The sections are permanently spliced in accordance with this connection. In making this test the switch 42 was not used, but if a sufficiently good balance had not been obtained, it would have been reversed, connecting the pairs P, $P^3$—P', $P^2$ and the measurements repeated.

While our improved system has been described in its application to the simultaneous determination of the capacities of two cable sections, it is equally applicable to measuring the unbalances of a single section or quad, this being connected to either the set of terminals 21, 22, 23, 24 or the set 21', 22', 23', 24', the switches 40, 41 and 42 associated with the particular set chosen being closed and the other switches being left open. Moreover, the apparatus is not to be considered as useful only for testing the unbalances in phantom circuits, since it may be employed for determining capacity relations in other connections. For the purposes of the detailed description, particular connections of the various devices to one another are illustrated and described, but many of these may be changed without departing from the spirit of our invention.

We claim:

1. In apparatus for determining capacities between the elements of phantom circuits, the combination of means for producing a variable potential adapted to be connected between one pair of elements, a potential detecting device adapted to be connected between another pair of the elements, and variable capacities associated with said elements and in parallel with the capacities between said elements.

2. In apparatus for determining capacities between the elements of a phantom circuit, the combination of means for producing variable potential adapted to be connected between one pair of elements, a potential detecting device adapted to be connected between another pair of elements, and a device adapted to simultaneously add capacity to one element of a pair and to subtract capacity from the other element of the pair.

3. In apparatus for determining capacities between the elements of a phantom circuit, the combination of inductive devices, means for producing variable potential adapted to be connected between a pair of elements through one of said devices, potential detecting means adapted to be connected between another pair of elements through the other of said devices, and variable capacities adapted to be associated with the said elements and in parallel with the capacities between said elements.

4. In apparatus for determining capacities between the elements of a phantom circuit, the combination of means for producing variable potential adapted to be connected between one pair of the elements, an impedance device, a potential detecting device adapted to be connected between another pair of the elements through said impedance device, and variable capacities adapted to be associated with said elements and in parallel with the capacities between said elements.

5. In apparatus for determining capacities between the elements of phantom circuits, the combination of means for producing variable potential, and potential detecting means, one of said means being adapted to be connected between the two sides of a phantom circuit, and the other of said means being adapted to be connected between the conductors of a pair of the elements, and variable capacities in parallel with the capacities between the conductors of one of said sides.

6. In apparatus for determining the capacities between the elements of phantom circuits, the combination of an impedance device, means for producing variable potential, and potential detecting means, one of said named means being adapted to be connected between the two sides of the phantom circuit through said impedance device, and the other of said named means adapted to be connected between the conductors of a pair of the elements, and variable capacities in parallel with the capacities between the conductors of one of said pairs.

7. In apparatus for determining capacities between elements of phantom circuits, the combination of a variable capacity, and means adapted to connect said capacity in different combinations between an element of one of the pairs of elements of a phantom circuit and both elements of another of the pairs, and means for indicating when the variation in the connected capacity has equalized the capacity between the elements.

8. In apparatus for determining capacities between the elements of phantom circuits, the combination of a variable capacity, means adapted to connect said capacity in different combinations between an element of one pair of elements of a phantom circuit and both elements of another of the pairs, means for determining when the variation in the connected capacity has equalized the capacity between the elements, and means for registering the amount of the equalizing capacity.

9. Apparatus for testing capacity unbalance adapted to be joined between successive sections of the pairs of elements of a phantom circuit, comprising a plurality of variable capacities, means adapted to connect said capacities in different combinations between an element of one of the pairs and both elements of another of the pairs, a source of varying potential of telephonic frequency adapted to be associated with one pair of elements, and a telephone receiver adapted to be associated with the other pair of elements.

10. Apparatus for testing capacity unbalance adapted to be joined between successive sections of the pairs of a phantom circuit, comprising a plurality of variable capacities, means adapted to connect said capacities in different combinations between an element of one of the pairs and both elements of another of the pairs, a source of varying potential of telephonic frequency adapted to be associated with one pair of elements, a telephone receiver adapted to be associated with the other pair of elements, and capacity registering means actuated in the variation of the capacities.

11. An apparatus for testing capacity unbalance in a plurality of related capacity elements, comprising an adjustable condenser having members adapted to be connected in parallel with certain of said capacity elements, unbalance indicating means adapted to be connected to a member of the condenser and to other capacity elements, and impedance elements connected to one another and at opposite extremities to members of said condenser, the juncture between the two impedance elements being connected to the indicating means.

12. An apparatus for testing capacity unbalance in a plurality of related capacity elements, comprising an adjustable condenser having members adapted to be connected in parallel with certain of said capacity elements, unbalance indicating means adapted to be connected to a member of the condenser and to other capacity elements, impedance elements connected to one another and at opposite extremities to members of said condenser, the juncture between the two impedance elements being connected to the indicating means, and a switch for rendering the impedance elements effective.

13. An apparatus for testing capacity unbalance comprising in combination a switch having terminals connected in pairs and means for transposing the connection of the pairs, an adjustable condenser having connections with said switch, and unbalance indicating means connected to a terminal of the condenser and to said switch.

14. A testing apparatus comprising in combination a switch having two sets of terminals of two pairs each, the pairs of terminals in one set being connected to the pairs of terminals in the other set and having switching members for transposing the connection of the pairs of terminals of both sets; a variable condenser provided with capacity members connected to said switching members, and a source of varying current of telephonic frequency and a telephone receiver, each having a connection with other of said switching members and with a condenser member.

15. A testing apparatus comprising in combination, a switch having two sets of terminals of two pairs each, the pairs of terminals in one set being connected to the pairs of terminals in the other set and having switching members for transposing the connection of the pairs of terminals of both sets; a variable condenser provided with capacity members connected to said switching members, a source of varying current of telephonic frequency and a telephone receiver, each having a connection with other of said switching members and with a condenser member, and a switch having terminals connected to terminals of said first-named switch and adapted to simultaneously transpose the connection of the terminals of the respective pairs of terminals.

16. A testing apparatus comprising in combination, a switch having two sets of terminals of two pairs each, the pairs of terminals on one set being connected to the pairs of terminals in the other set and having switching members for transposing the connection of the pairs of terminals of both sets; a condenser provided with three capacity members connected to said switching members, two of said members being fixed and the third member being movable; a source of varying current of telephonic frequency connected to said fixed capacity members and a telephone receiver connected to said movable capacity member and to another of said switching members, and a second switch having terminals connected to terminals of said first-named switch and adapted to simultaneously transpose the connection of the terminals of the respective pairs of terminals.

In testimony whereof, we have signed our names to this specification in the presence of two subscribing witnesses.

GEORGE A. CAMPBELL.
  OTTO B. BLACKWELL.

Witnesses:
 ROBERT S. SMILIFFE,
 FRANK POWELL.

In testimony whereof, I have signed my name to this specification in the presence of two subscribing witnesses, this 26th day of March 1912.

EDWIN H. COLPITTS.

Witnesses:
 HOWARD M. MORSE,
 FRANK H. FALLON.